Oct. 12, 1965   G. F. D. VANDAMME   3,210,971
SAFETY DEVICE FOR PREVENTING OPENING OF A SLIDE FASTENER
Filed April 21, 1964   2 Sheets-Sheet 1
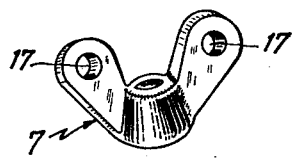
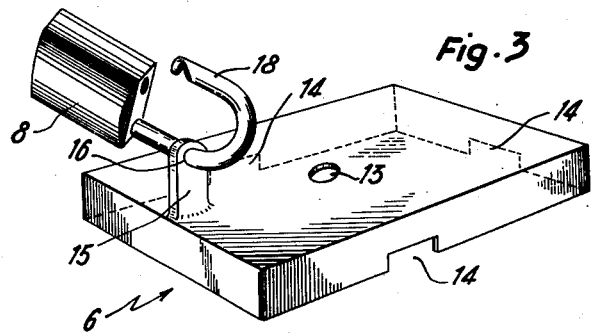
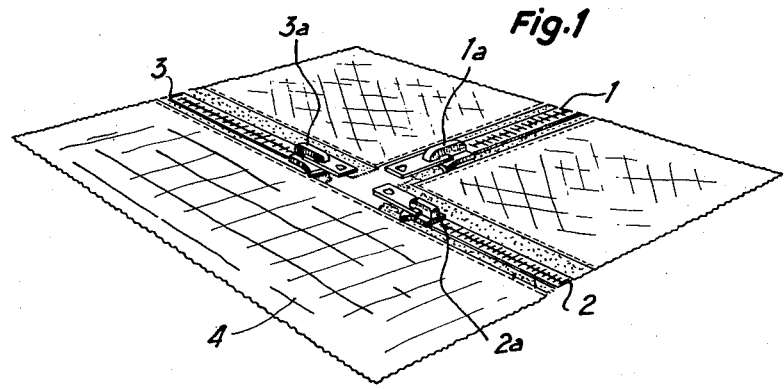
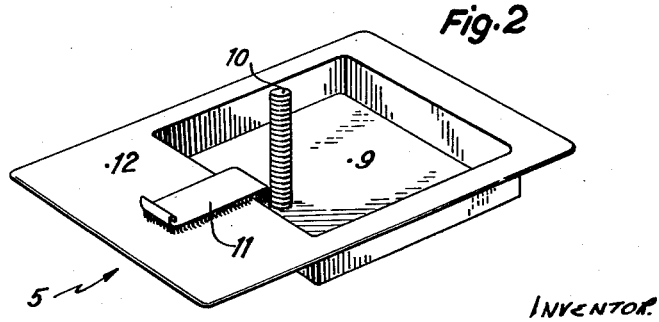
INVENTOR.
GEORGES, FRANCOIS DOMINIQUE VANDAMME

United States Patent Office

3,210,971
Patented Oct. 12, 1965

3,210,971
SAFETY DEVICE FOR PREVENTING OPENING
OF A SLIDE FASTENER
Georges Francois Dominique Vandamme, 293 rue
Fouquet-Lelong, Marcq-en-Baroeul (Nord), France
Filed Apr. 21, 1964, Ser. No. 361,352
Claims priority, application France, May 3, 1963,
933,612, Patent 1,364,013; July 23, 1963, 942,335,
Patent 84,048; Dec. 3, 1963, 955,851, Patent 84,879
13 Claims. (Cl. 70—68)

The present invention relates to safety or locking devices for making slide fasteners inviolable against opening, and more particularly to such devices for locking tents closed by slide fasteners.

It has proved very convenient to close camping tents by means of slide fasteners applied to an inner tent, if there is one, or to the inner and outer tent. However, such closures have the disadvantage that anyone may open them readily by moving the runners of the slide fasteners forming the closure.

It is the primary object of the present invention to make such closures inviolable and to prevent access to the slide fastener runners by unauthorized persons.

With this and other objects in view, I have provided a safety device for preventing the opening of a slide fastener having a runner and joining two adjacent webs, the device being operable from either side of the webs, i.e. from the inside or the outside of a tent if the webs are tent cloth walls joined by a plurality of slide fasteners, for instance three. This safety device includes two co-operating safety elements enclosing the runner or runners, the first safety element defining a recessed area for accommodating the slide fastener runner or runners and the second safety element forming a cover of the recessed area of the first safety element. Means is provided for attaching the first safety element to one of the webs, i.e. one of the tent cloth walls, and further means is provided for connecting the two safety elements. To prevent access to the runner or runners within the recessed area, means is provided for locking the connecting means together to maintain the cover closed over the recessed area.

In one embodiment of the invention, the connecting means comprises a threaded bolt mounted on the first safety element and passing through a cooperating aperture in the second safety element, and a wing nut threadedly engaging the bolt above the cover. Each ear of the wing nut defines a hole and a perforated lug is arranged on the cover. The locking means is a padlock whose bow passes through the hole in the lug and one of the holes in the wing nut.

According to a preferred feature, the means for attaching the first safety element to the one web comprises a flat web support mounted in the recessed area of the first safety element and a buckle means arranged for cooperation with the web support for clamping the one web between the buckle means and the web support. A wire element extends from the buckle means and a transverse wire support axle is mounted in the recessed area. An intermediate portion of the wire element is wound about the axle and an end of the wire element opposite the buckle means is in contact with the bottom wall of the recessed area whereby the buckle means is resiliently pressed against the web support. A stem is pivotally mounted on the first safety element to form the connecting means, means being provided to connect the stem with the spring wire element so that the latter's resiliency maintains the stem substantially perpendicularly in the recessed area and it may pass through a cooperating aperture in the second or cover safety element.

The above and other objects, advantages and features of the present invention will become more apparent in connection with the following detailed description of two preferred embodiments thereof, taken in conjunction with the accompanying drawing wherein FIG. 1 is a perspective view of the closure of a camping tent, three adjacent webs of the tent being shown flat to afford a better understanding of the invention and the webs being joined by three slide fasteners;

FIGS. 2, 3 and 4 are perspective views of parts of one embodiment of a safety device according to the invention, the parts being shown in their actual position in relation to the tent closure before the device has been assembled and locked;

Figure 5:
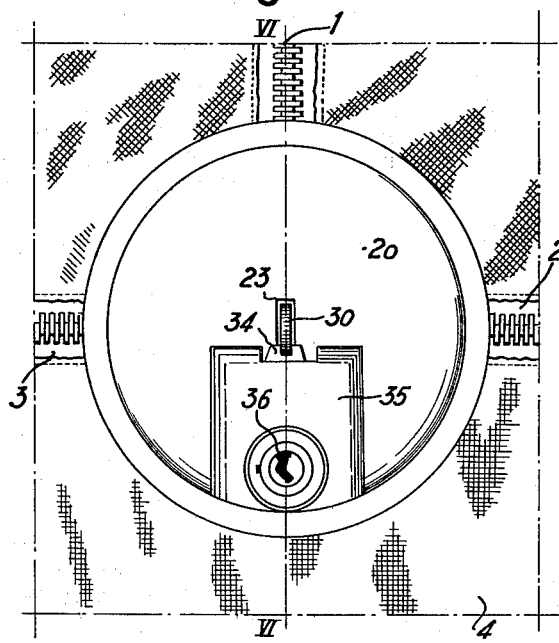
FIG. 5 is a plan view of a preferred embodiment of a safety device mounted over the three runners of the slide fasteners of a tent closure of the type shown in FIG. 1.

Referring now to the drawing, and first to FIGS. 1–4, the ground cover 4 of a camping tent is shown to be joined to two cloth walls of the tent by slide fasteners 2 and 3, the two walls being joined together by slide fastener 1, runners 1a, 2a and 3a being attached to the slide fasteners. All of this is conventional and the safety device of the present invention may be used on such a structure to prevent the opening of the slide fasteners.

As shown in FIGS. 2–4, the safety device includes a first safety element 5 defining a recessed area 9 for accommodating the slide fastener runners and thus constituting a box-like structure. A second safety element 6 is designed to form a cover over the recessed area 9 and cooperates therewith to enclose the runners 1a, 2a, 3a in this box-like structure.

Means is provided for connecting the safety elements 5 and 6, the illustrated means including a threaded bolt 10 mounted on safety element 5 and passing through a cooperating aperture 13 on the cover 6. A wing nut 7 threadedly engages the bolt above the cover after the same has been placed over the element 5. Means is also provided for locking the connecting means together to maintain the cover closed over the recessed area of safety element 5 whereby access to the runners is prevented. The illustrated locking means is a padlock 8. A lug 15 defining a hole 16 is arranged on the cover, being integral therewith in the illustrated embodiment, and each ear of the nut 7 defines a hole 17. The bow 18 of the padlock passes through the hole 16 and one of holes 17 in the wing nut to hold the safety device in its locked condition.

The first safety element 5 has means for attachment to one of the webs, i.e. ground cover 4 of the tent in the illustrated embodiment. This attaching means includes a flat web support 12 extending integrally from the element 5 and a resilient flap 11 mounted on the element for clamping cooperation with the web support 12. One of the webs, i.e. ground cover 4, may thus be clamped between support 12 and flap 11 so as to maintain the safety device in place during the locking operation.

As shown, the vertical side walls of cover 6 have cutouts 14 designated to accommodate the slide fasteners 1, 2, 3.

The operation of the safety device will be obvious from the above description of its structure. The first safety element 5 is attached to the web 4 by clamping the same between the support plate 12 and resilient flap 11, whereupon the bolt 10 is passed through the free space left between runners 1a, 2a, 3a of the slide fasteners which have been closed. In this position, the runners are accommodated within the recessed area 9 of element 5. The cover element 6 is now placed over the slide fastener closure by aligning the cut-outs 14 with the slide fasteners and placing the aperture 13 of the cover over the threaded bolt 10. The wing nut 7 is now driven home on the bolt until the cover sits tightly on the element 5 and one of the holes 17 in the ears of the wing nut is in alignment with the hole 16 of lug 15. Now the bow 18 of padlock 8 is passed through holes 16, 17 and the padlock is closed.

The embodiment of FIGS. 5 to 8 is particularly advantageous, like reference numerals designating the same parts as in FIGS. 1 to 4. In this embodiment, the first element 19 and the second cover element 20 are circular instead of square. They have respective annular flanges 21 and 22 cooperating with each other to close the safety device.

Figure 6:
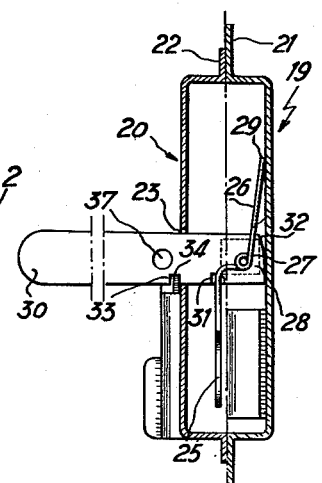
FIG. 6 is a section along line VI—VI of FIG. 5.
Figure 8:
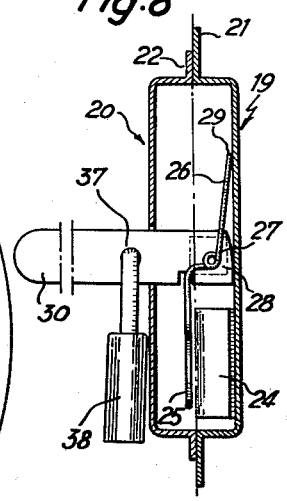
FIG. 8 is a section similar to that of FIG. 6 but showing a padlock locking means instead of a bolt lock.

The means for attaching the first safety element 19 to one of the webs comprises a flat web support 24 which may simply be a profiled metal piece soldered to the bottom of the recessed area of the element. A buckle means constituted in the illustrated embodiment by a ring 25 is arranged for cooperation with the web support 24 for clamping the one web between the ring 25 and the support 24. A steel wire element 26 extends from the ring 25, the ring being simply formed of one end of the wire element 26 in the illustrated embodiment. As best seen in FIGS. 6 and 8, an intermediate portion of the steel wire 26 is wound about a transverse wire support axle 27 mounted in the recessed area and being parallel to the bottom thereof. This support axle extends from a lug 28 fixed to the bottom, for instance by soldering. The wire end 29 opposite the ring 25 is in contact with the bottom wall of the recessed area so that the wire forms a spring pressing the ring 25 resiliently against the web support 24 so that a web, such as ground cover 4, may be clamped between ring 25 and support 24 for attachment of the element 19 to the ground cover.

Figure 7:
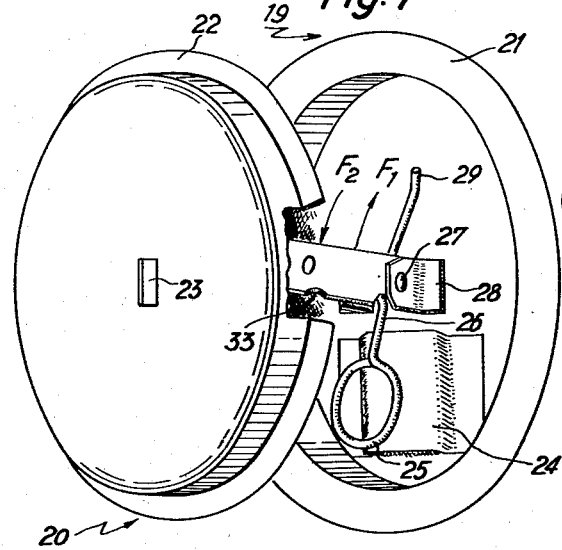
FIG. 7 is a perspective view of the safety device of FIGS. 5 and 6 before the two safety elements are closed.

The connecting means of this embodiment includes a stem 30 pivotally mounted on the first safety element 19 and having a hole 37. As best seen in FIGS. 6–8, the stem is pivotally mounted on the axle 27 while an elbow in the steel wire 26 engages a notch 31 in stem 30. In this manner the stem is connected with the wire so that the latter's resiliency maintains stem 30 substantially perpendicular in the recessed area of safety element 19.

It will be understood that the ring 25 may be disengaged from support 24 by slightly pivoting the stem 30 in the direction of arrow F₁, which permits the web to be slipped between the two clamping members. When the stem is released, the spring pressure of wire 26 will force the stem back into its original position in the direction of arrow F₂ so that the interposed web will be clamped between ring 25 and support 24. During the first pivoting movement, the cammed end 32 of the stem 30 abut against the bottom wall of the recessed area of element 19 so that the resiliency limit of the spring wire 26 not be surpassed.

The pivotal stem 30 has a cut-out 33 for engagement with the bolt 34 of a lock 35 fixed to the outer face of the circular cover element 20. As shown in FIG. 5, the lock 35 has a key-hole 36 for insertion of a key to actuate bolt 34. The safety device, is of course, so mounted on a camping tent that the keyhole 36 is outside the tent. Upon actuation of the bolt, the two safety device elements 19, 20 are so locked together that access to the runners accommodated within these elements is effectively prevented.

The stem also has a hole 37 so that the bow of a padlock 38 may be passed therethrough if the lock 35 is broken. Alternately, as shown in FIG. 8, only hole 37 may be provided in the stem for sole use with a padlock.

It will be understood that, while the invention has been described in connection with two specific embodiments, many variations and modifications may occur to those skilled in the art, particularly after benefiting from the present teaching, without departing from the spirit and scope of this invention as defined in the appended claims.

I claim:
1. A safety device for preventing the opening of a slide fastener having a runner and joining two adjacent webs, comprising
  (a) a first safety element defining a recessed area for accommodating the slide fastener runner,
  (b) attaching means for releasably attaching the first safety element to one of said webs,
  (c) a second safety element forming a cover over said recessed area of the first safety element and cooperating therewith to enclose the runner,
  (d) means for connecting the two safety elements while said first element is attached to said one web by said attaching means, and
  (e) means for locking the connecting means together to maintain the cover closed over the recessed area of the first safety element whereby access to the runner is prevented.

2. The safety device of claim 1, wherein the attaching means includes a resilient attaching member mounted on said first safety element for clamping cooperation therewith.

3. The safety device of claim 1, wherein the connecting means comprises a threaded bolt mounted on the first safety element and passing through a cooperating aperture in the second safety element, and a nut threadedly engaging the bolt above the cover.

4. The safety device of claim 3, wherein the nut is a wing nut and each ear of the nut defines a hole, a lug is arranged on the cover and the lug defines a hole, and the locking means is a padlock comprising a bow passing through the hole in the lug and one of the holes in the wing nut.

5. The safety device of claim 1, wherein the means for attaching the first safety element to the one web comprises a flat web support mounted in the recessed area of the first safety element, a buckle means arranged for cooperation with the web support for clamping the one web between the buckle means and the web support, a wire element extending from the buckle means, a transverse wire support axle mounted in the recessed area, an intermediate portion of the wire element being wound about said axle and an end of the wire element opposite the buckle means in contact with the bottom wall of the recessed area whereby the buckle means is resiliently pressed against the web support.

6. The safety device of claim 5, wherein the connecting means comprises a stem mounted on the first safety element and having a cut-out, the stem passing through a cooperating aperture in the second safety element, and the locking means is a lock having a locking element passing through the cut-out of the stem.

7. The safety device of claim 6, wherein the lock is fixed on the second safety element and has a bolt arranged to engage the cut-out in the stem.

8. The safety device of claim 6, wherein the lock is a padlock comprising a bow passing through a hole in the stem.

9. The safety device of claim 6, wherein the stem is pivotally mounted on the first safety element and means is provided for connecting the stem with the wire element so that the latter's resiliency maintains the stem substantially perpendicular in the recessed area.

10. The safety device of claim 1, wherein three adjacent webs are joined by three of said slide fasteners, the three runners of said slide fasteners being accommodated in the recessed area of the first safety element.

11. A safety device for preventing the opening of a slide fastener having a runner and joining two adjacent webs, comprising:

(a) a first safety element defining a recessed area for accommodating the slide fastener runner;
(b) a second safety element forming a cover over said recessed area of the first safety element and cooperating therewith to enclose the runner;
(c) attaching means for releasably attaching one of said safety elements to one of said webs,
  (1) said attaching means including a resilient attaching member mounted on said one safety element for clamping cooperation therewith;
(d) connecting means for connecting the other safety element to said one safety element while the latter is attached to said one web by said attaching means; and
(e) locking means for locking the connecting means to maintain said cover closed over said recessed area whereby access to the runner is prevented.

12. A lockable closure arrangement including, in combination:
(a) two webs;
(b) a slide fastener joining said webs, said slide fastener including a runner;
(c) a first safety element defining a recessed area therein, said area being dimensioned to enclose said runner;
(d) a second safety element constituting a cover for said area;
(e) attaching means for releasably attaching one of said safety elements to one of said webs;
(f) connecting means for connecting the other safety element to said one safety element as a cover for said recessed area, and for thereby enclosing said runner in said recessed area; and
(g) locking means for locking the connecting means to maintain said cover closed over said recessed area whereby access to the runner is prevented.

13. An arrangement as set forth in claim 12, wherein the attaching means includes a resilient attaching member mounted on said first safety element for clamping cooperation therewith.

References Cited by the Examiner

UNITED STATES PATENTS

| | | | |
|---|---|---|---|
| 297,938 | 4/84 | Judd | 70—70 |
| 1,557,382 | 10/25 | Sundback | 70—68 |
| 2,183,121 | 12/39 | Levine | 70—70 X |
| 2,578,035 | 12/51 | Bashover | 70—68 |
| 3,070,986 | 1/63 | Hart | 70—68 |

FOREIGN PATENTS 142,257  6/35  Austria.

ALBERT H. KAMPE, *Primary Examiner.*

BOBBY R. GAY, *Examiner.*